US012701226B2

(12) United States Patent
Zhang et al.

(10) Patent No.: US 12,701,226 B2
(45) Date of Patent: Aug. 4, 2026

(54) ADAPTIVE WIENER FILTER SHAPE FOR VIDEO AND IMAGE COMPRESSION

(71) Applicant: Tencent America LLC, Palo Alto, CA (US)

(72) Inventors: Han Zhang, Palo Alto, CA (US); Roman Chernyak, Santa Clara, CA (US); Lien-Fei Chen, Hsinchu (TW); Madhu Peringassery Krishnan, Mountain View, CA (US); Biao Wang, San Jose, CA (US); Xin Zhao, San Jose, CA (US); Motong Xu, Palo Alto, CA (US); Yonguk Yoon, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/893,540

(22) Filed: Sep. 23, 2024

(65) Prior Publication Data

US 2025/0106392 A1 Mar. 27, 2025

Related U.S. Application Data

(60) Provisional application No. 63/540,630, filed on Sep. 26, 2023.

(51) Int. Cl.
| | |
|---|---|
| *H04N 19/117* | (2014.01) |
| *H04N 19/132* | (2014.01) |
| *H04N 19/172* | (2014.01) |
| *H04N 19/186* | (2014.01) |
| *H04N 19/82* | (2014.01) |

(52) U.S. Cl.
CPC ......... *H04N 19/117* (2014.11); *H04N 19/132* (2014.11); *H04N 19/172* (2014.11); *H04N 19/186* (2014.11); *H04N 19/82* (2014.11)

(58) Field of Classification Search
CPC .. H04N 19/117; H04N 19/132; H04N 19/172; H04N 19/186; H04N 19/82
See application file for complete search history.

(56) References Cited

U.S. PATENT DOCUMENTS

| | | | | | |
|---|---|---|---|---|---|
| 2012/0269261 | A1* | 10/2012 | Choi | ...... | H04N 19/82 |
| | | | | | 375/E7.245 |
| 2014/0086501 | A1* | 3/2014 | Ikeda | ...... | H04N 19/82 |
| | | | | | 382/233 |
| 2018/0309987 | A1* | 10/2018 | Kim | ...... | H04N 19/82 |
| 2018/0359480 | A1* | 12/2018 | Xiu | ...... | H04N 19/186 |

(Continued)

*Primary Examiner* — MD N Haque
(74) *Attorney, Agent, or Firm* — ARENTFOX SCHIFF LLP

(57) ABSTRACT

Some aspects of the disclosure provide a method of video decoding. The method includes: receiving a bitstream that comprises coded information of one or more pictures; generating, according to the bitstream, at least a to-be-filtered sample, and input samples for filtering the to-be-filtered sample in an in-loop filter, the in-loop filter using a Wiener-based filter with an adaptive filter shape; determining a modified filter shape for the Wiener-based filter, the modified filter shape being adapted according to a relationship between the to-be-filtered sample and the input samples; and applying the Wiener-based filter with the modified filter shape on the input samples to generate a filtered output of the to-be-filtered sample.

20 Claims, 7 Drawing Sheets

(56)                         References Cited

U.S. PATENT DOCUMENTS

2019/0182482 A1*   6/2019  Vanam ................. H04N 19/176
2021/0392382 A1*  12/2021  Zhu ...................... H04N 19/172
2022/0109853 A1*   4/2022  Zhang ...................... G06N 3/09
2022/0109889 A1*   4/2022  Zhang ................... H04N 19/46
2023/0007245 A1*   1/2023  Sarwer .................. H04N 19/82

* cited by examiner

ADAPTIVE WIENER FILTER SHAPE FOR VIDEO AND IMAGE COMPRESSION

INCORPORATION BY REFERENCE

The present application claims the benefit of priority to U.S. Provisional Application No. 63/540,630, "ADAPTIVE WIENER FILTER SHAPE FOR VIDEO AND IMAGE COMPRESSION" filed on Sep. 26, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods and apparatuses for video encoding/decoding. In some examples, an apparatus for video encoding/decoding includes processing circuitry.

Some aspects of the disclosure provide a method of video decoding. The method includes: receiving a bitstream that comprises coded information of one or more pictures; generating, according to the bitstream, at least a to-be-filtered sample, and input samples for filtering the to-be-filtered sample in an in-loop filter, the in-loop filter using a Wiener-based filter with an adaptive filter shape; determining a modified filter shape for the Wiener-based filter, the modified filter shape being adapted according to a relationship between the to-be-filtered sample and the input samples; and applying the Wiener-based filter with the modified filter shape on the input samples to generate a filtered output of the to-be-filtered sample.

Some aspects of the disclosure provide a method of video encoding. The method includes: generating, during an encoding process of one or more pictures into a bitstream, at least a to-be-filtered sample and input samples for filtering the to-be-filtered sample in an in-loop filter, the in-loop filter using a Wiener-based filter with an adaptive filter shape; determining a modified filter shape for the Wiener-based filter, the modified filter shape being adapted according to a relationship between the to-be-filtered sample and the input samples; applying the Wiener-based filter with the modified filter shape on the input samples to generate a filtered output of the to-be-filtered sample; and encoding the one or more pictures based on the filtered output.

Aspects of the disclosure also provide an apparatus for video encoding/decoding.

Aspects of the disclosure also provide a method for processing visual media data. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
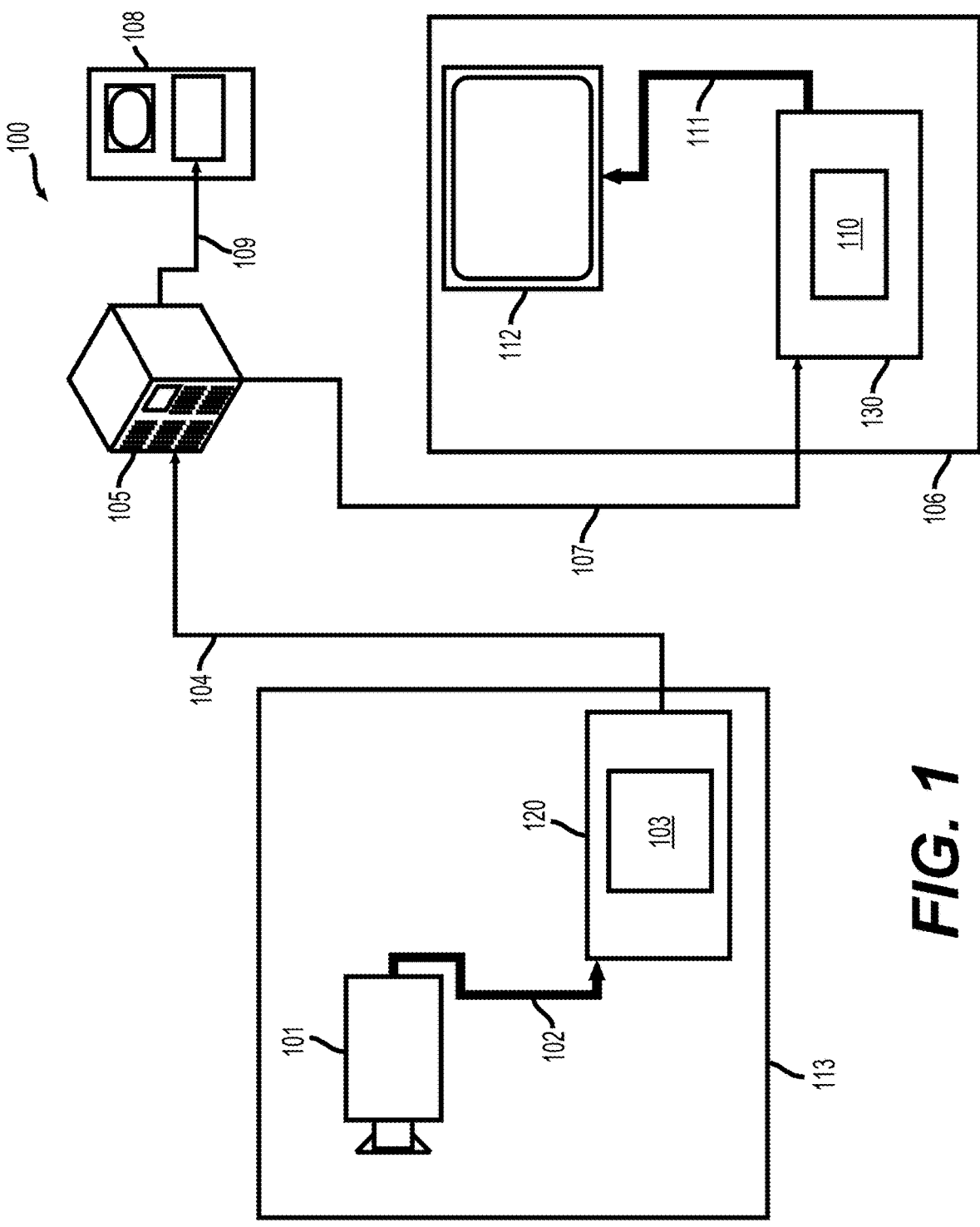
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
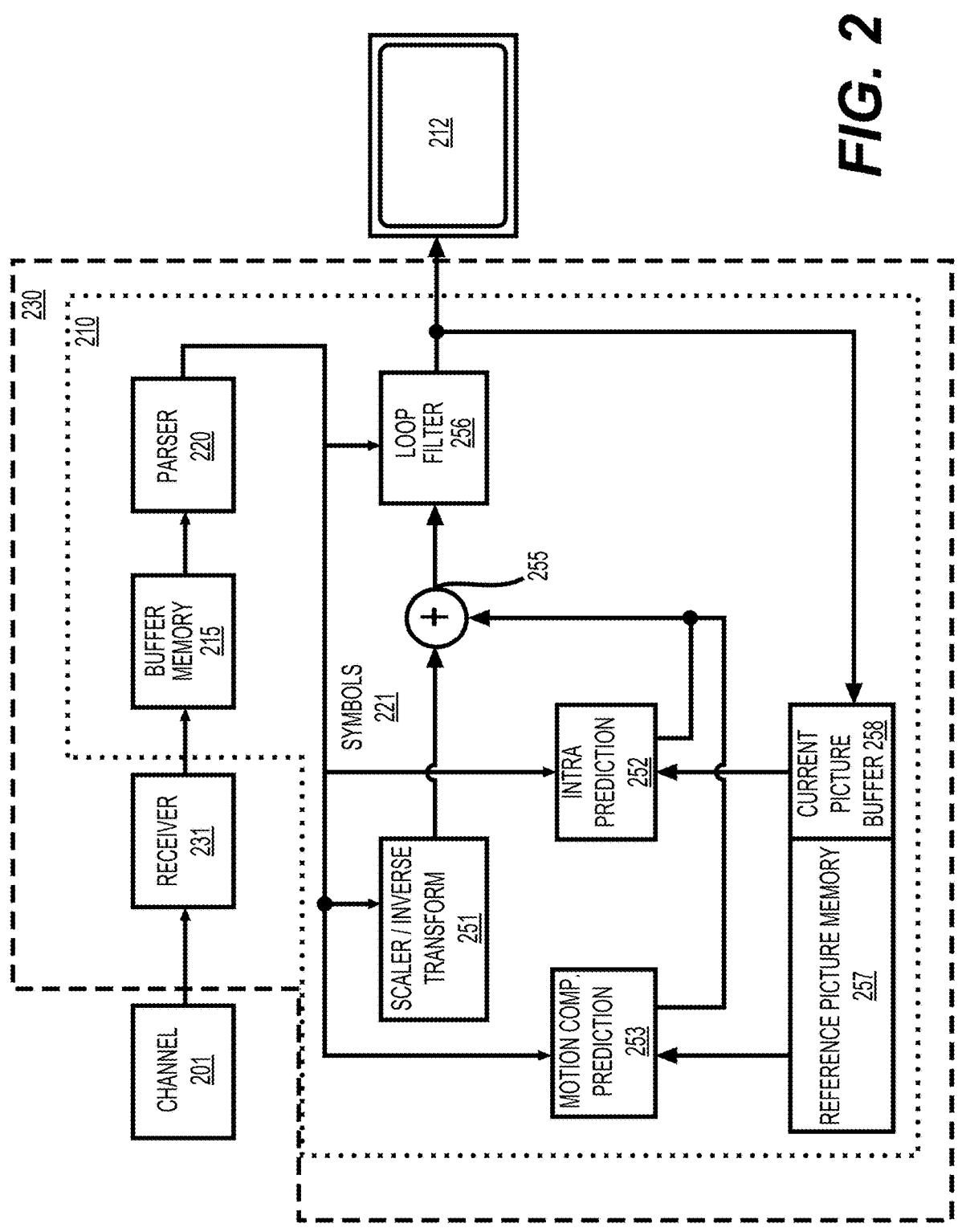
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
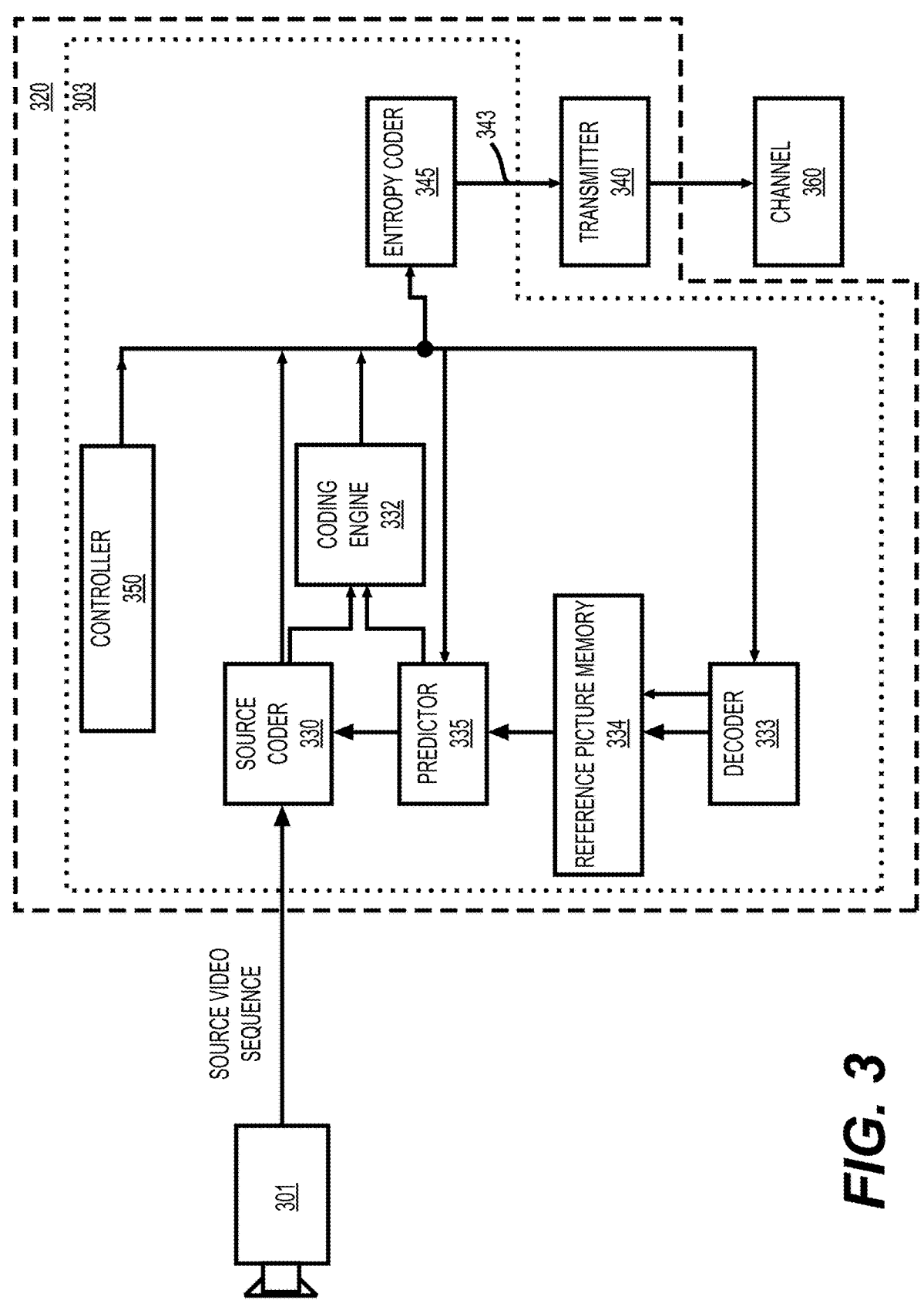
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/ entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some examples, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

In some video coding examples (e.g., VVC, ECM and AV2), Wiener-based filter can be used in the in-loop filter, such as the loop filter unit (256), to reduce the distortion between the reconstructed and original samples. Some aspects of the present disclosure provide some techniques of adaptive shape for Wiener-based filter to improve the compression efficiency further.

In some examples, a loop filter with block-based filter adaption can be applied by encoders/decoders to reduce artifacts. For a luma component, one of a plurality of filters (e.g., 25 filters) can be selected for a 4×4 luma block, for example, based on a direction and activity of local gradients.

In some examples, a loop filter can have any suitable shape and size.

Figure 4:
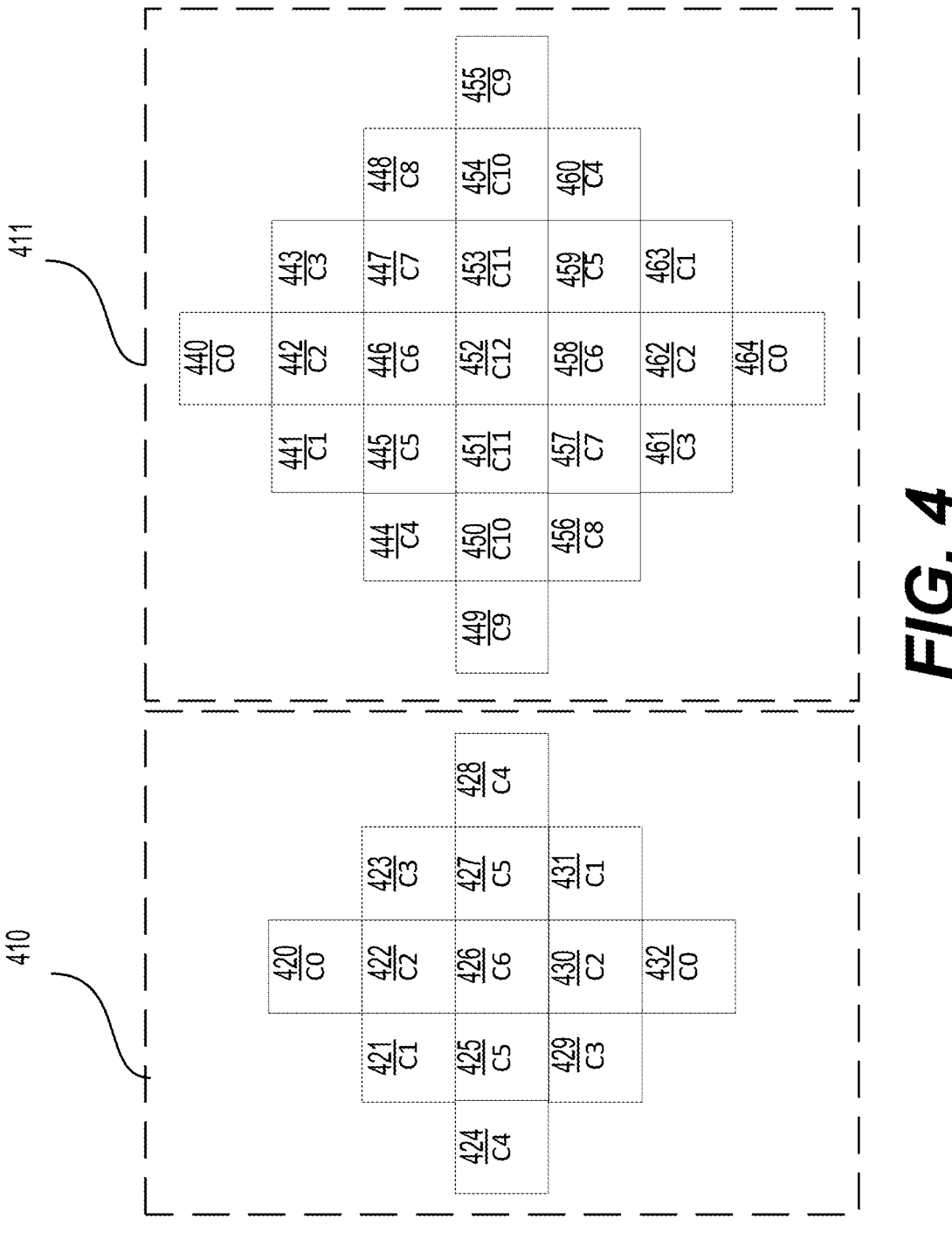
FIG. 4 shows an example of using a diamond shape for loop filter.

FIG. 4 shows an example of using a diamond shape for loop filter. In the FIG. 4 example, a loop filter can use a 5×5 diamond-shape as shown by filter shape (410) for chroma filtering and use a 7×7 diamond-shape as shown by filter shape (411) for luma filtering. In the filter shape (410), elements (420)-(432) form a diamond shape and can be used in the filtering process. Seven values (e.g., C0-C6) can be assigned to be filter coefficients to the elements (420)-(432). In the loop filter (411), elements (440)-(464) forms a diamond shape and can be used in the filtering process. Thirteen values (e.g., C0-C12) can be used assigned to be filter coefficients for the elements (440)-(464).

In some examples, filter coefficients at locations indicated by the values (e.g., C0-C6 in (410) or C0-C12 in (420)) are non-zero.

In some examples, the to-be-filtered sample is at the center position of the filter shape, such as input samples at the positions of element (426) and element (452). In FIG. 4. Samples covered by the filter shape are input samples to the filter, and filter coefficients can be applied to the input samples to generate the filtered output.

In some examples, for block-based filter adaption, block classification of a luma component is performed. For example, a 4×4 block (or luma block, luma CB) can be categorized or classified as one of multiple (e.g., 25) classes. In some examples, a classification index can be derived based on a directionality parameter and a quantized value of an activity value.

The present disclosure provides various techniques that can be used in loop filter. The techniques can be used separately or combined in any order. In some examples, the techniques can be implemented by processing circuitry (e.g., one or more processors or one or more integrated circuits).

In some related image and video codecs examples, a Wiener-based filter is used as an in-loop filter. For each to-be-filtered sample, the output of the Wiener-based filter is generated by a combination of input (e.g., neighboring or non-neighboring) samples covered by a pre-defined filter shape. For example, the output of the Wiener-based filter with N filter taps (filter coefficients) can be represented using Eq. (1)

$$r_{filted} = \sum_{i=0}^{N-1} c_i r_i \qquad \text{Eq. (1)}$$

where $r_{filted}$ denotes the filtered output. $r_i$ denotes the i-th input sample covered by the filter shape, and $c_i$ is the corresponding filer coefficient for the i-th filter tap.

According to an aspect of the disclosure, in the related image and video codecs examples, all to-be-filtered samples use the same filter shape without considering the relationship between input and center samples.

The present disclosure provides techniques of adaptive shape for Wiener-based filter (referred to as "adaptive shape"). The techniques can include three aspects: a) determining the filter shape; b) determining and signaling the proposed adaptive shape; and c) applying the Wiener-based filter with the adaptive shape. For example, encoder/decoder can generate at least a to-be-filtered sample, and input samples for filtering the to-be-filtered sample in an in-loop filter, the in-loop filter uses a Wiener-based filter with an adaptive filter shape. The encoder/decoder can determine a modified filter shape for the Wiener-based filter, the modified filter shape being adapted according to a relationship between the to-be-filtered sample and the input samples; and apply the Wiener-based filter with the modified filter shape on the input samples to generate a filtered output of the to-be-filtered sample.

In some examples, when saying adaptive shape, the to-be-filtered samples can use different filter shapes adapted to the input samples to generate the filtered output. The actual filter shape can be a predefined filter shape, a subset of a predefined filter shape (e.g., a subset of elements in a predefined filter shape) or a filter shape determined on the fly having the same number of filter taps as the predefined filter. For the predefined filter shape, all input samples are employed to generate the filtered output, while for a subset of the pre-defined filter, partial input samples are utilized to generate the filtered output. In the case of filter shapes determined on the fly, the number of input samples employed is the same as the predefined filter, but what constitutes the input samples can be determined using thresholds, such as some examples according to the following description.

In the present disclosure, the techniques of adaptive shape can be applied to any color component (Y, Cb or Cr) or cross-component. The techniques of adaptive shape can be applied to each of the color components or can be applied to any of the color components, can be applied to all of the color components or can be applied to any combination of the color components.

First aspects of the disclosure provide techniques to adaptively determine the filter shape based on a relationship between the to-be-filtered sample and input samples. In some examples, some input samples are marked as outliers according to the relationship and then the filter taps corresponding to the outliers are removed (e.g., filter coefficients are zeroed out) from the pre-defined filter shape or modified when generating the final filtered output.

In first embodiments according to the first aspects (hereafter referred to as embodiments a of the first aspects), a difference between the to-be-filtered sample and each input sample is compared to a threshold value denoted by $thr_{diff}$. The input sample is marked as outlier based on the comparison. In some examples, the same threshold value is used for all filter taps. In an example, given an absolute threshold value as $thr_{diff}$, the corresponding positive threshold and negative threshold are defined, such as $+thr_{diff}$ and $-thr_{diff}$, respectively. An input sample is marked as normal when the difference of the input sample to the to-be-filtered sample is in the range $[-thr_{diff}, +thr_{diff}]$; otherwise, the difference of the input sample to the to-be-filtered sample is out of the range $[-thr_{diff}, +thr_{diff}]$, the input sample is marked as outlier.

In second embodiments according to the first aspects (hereafter referred to as embodiments b of the first aspects), the difference between the to-be-filtered sample and each input sample is compared to a threshold value selected from some predefined threshold candidates. In some examples, all filter taps use the same threshold value. In some examples, a set of predefined threshold candidates can be determined based on the input bitdepth, input dynamic range, codec internal bitdepth, quantization step size, and the like. In some examples, a threshold value can be selected from a set of predefined threshold candidates based on the input bitdepth, input dynamic range, coded internal bitdepth, quantization step size and the like. In an example, given predefined absolute threshold candidates [1024, 128, 32, 8], one of the candidate $thr_{diff}$ is selected and used as the threshold value for all filter taps. When a difference of an input sample to the to-be-filtered sample is out of the range $[-thr_{diff}, +thr_{diff}]$, the input sample is marked as outlier.

In third embodiments according to the first aspects (hereafter referred to as embodiments c of the first aspects), the difference between the to-be-filtered sample and each input sample is compared to a threshold value that is adapted to filter tap. The threshold value can be different for each filter tap. In an example, a mapping between the filter tap positions to the threshold values is used. The threshold value can be directly determined based on the filter tap position according to the mapping. In another example, each filter tap can use one of the predefined threshold candidates. The pre-defined threshold candidates can be determined based on the input bitdepth, input dynamic range, codec internal bitdepth, and the like. For example, given predefined absolute threshold candidates [1024, 128, 32, 8], for a filter tap, one of the pre-defined absolute threshold candidates is selected based on the position of the filter tap according to the mapping as the threshold value to determine whether an input sample corresponding to the filter tap is outlier.

In fourth embodiments according to the first aspects (hereafter referred to as embodiments d of the first aspects), whether an input sample is marked as outlier depends on its position inside a region. For example, when the input sample is outside the region, the input sample is an outlier. In an example, when an input sample is out of the boundary of a picture, the input sample is marked as outlier. In an example, when an input sample is out of the boundary of a slice, the input sample is marked as outlier. In an example, when an input sample is out of the boundary of a tile, the input sample is marked as outlier.

In fifth embodiments according to the first aspects (hereafter referred to as embodiments e of the first aspects), whether an input sample is marked as outlier depends on the filter tap position. In an example, only the input samples with the farthest distance from the to-be-filtered sample are marked as outliers.

In sixth embodiments according to the first aspects (hereafter referred to as embodiments f of the first aspects), the number of filter taps is the same as the pre-defined filter, but the filter shape adapts to the region around the sample to be filtered. In some examples, all the samples in a predetermined area around the to-be-filtered sample are considered as possible candidates for the filtering process. A pruning process is then performed to weed out the outliers. In an example, the pruning process starts from the immediate neighborhood of the to-be-filtered sample and continue outwards till enough candidates are obtained for the filtering process (e.g., the number of enough candidates is determined by number of filter taps). In some examples, what constitutes an input sample or an outlier is determined using techniques described with regard to the embodiments b to the embodiments e of the first aspects.

In seventh embodiments according to the first aspects (hereafter referred to as embodiments g of the first aspects), the difference between the to-be-filtered sample and each input sample is calculated (denoted as delta). The input sample is still used as an input sample for the filtering process regardless the value of delta, however, the weighting (also referred to as filter coefficient) is further adjusted based on the value of delta. In an example, the value of the weighting is further attenuated for an input sample associated with a bigger value of delta. In another example, the weighting is further adjusted based on a function using delta as input (e.g., in a similar manner as the weighting adjustment in bilateral filtering).

In eighth embodiments according to the first aspects (hereafter referred to as embodiments h of the first aspects), the techniques described above in the embodiments a of the first aspects to the embodiments g of the first aspects can also apply to cross-component Wiener filtering process, which can use reconstruction samples of a first color component as input to the filtering process and the output of the filtering process is an adjustment of a reconstruction sample of a second color component. It is noted that when the techniques described above in the embodiments a of the first aspects to the embodiments g of the first aspects are applied to cross-component Wiener filtering process, the center sample and input samples mentioned in the embodiments a of the first aspects to the embodiments g of the first aspects are replaced by the center sample of the first color component (co-located with the to-be-filtered sample of the second color component) and its neighboring samples of the first color component. For example, the input samples includes a center sample in the first color component and neighboring samples of the center sample in the first color component, the to-be-filtered sample is in a second color component and is a collocated sample to the center sample.

Second aspects of the disclosure provide technique to apply the Wiener-based filter based on the adaptive shape when a determination of using the adaptive shape for Wiener-based filter is true.

In first embodiments according to the second aspects (hereafter referred to as embodiments a of the second aspects), the filter output of a Wiener-based filter is generated by a combination of input samples but excludes the samples marked as outliers. For example, for a filter with N filter taps, when the samples covered by the k-th, m-th filter taps are marked as outliers (k and m are integers that are equal or larger than 0) the filter output can be calculated according to Eq. (2):

$$r_{filted} = \sum_{i=0}^{k-1} c_i r_i + \sum_{j=k+1}^{m-1} c_j r_j + \sum_{l=m+1}^{N-1} c_l r_l \qquad \text{Eq. (2)}$$

In second embodiments according to the second aspects (hereafter referred to as embodiments b of the second aspects), the output of Wiener-based filter is generated by a combination of input samples that are not marked as outliers with corresponding scaled coefficients. For example, for a filter with N filter taps, when the samples covered by the k-th, m-th filter taps are marked as outliers, the filter output can be calculated according to Eq. (3):

$$r_{filted} = \sum_{i=0}^{k-1} s * c_i r_i + \sum_{j=k+1}^{m-1} s * c_j r_j + \sum_{l=m+1}^{N-1} s * c_l r_l \qquad \text{Eq. (3)}$$

where s denotes a scaling factor, $$s = \frac{\sum_{i=0}^{N-1} c_i}{\sum_{i=0}^{k-1} c_i + \sum_{j=k+1}^{m-1} c_j + \sum_{l=m+1}^{N-1} c_l}.$$

In third embodiments according to the second aspects (hereafter referred to as embodiments c of the second aspects), more than one Wiener-based filter sets are used to generate the filter output. Among the different Wiener-based filter sets, one of the Wiener-based filter sets corresponds to samples that do not use the adaptive shape. The remaining Wiener-based filter sets are used for samples that use adaptive shape. All the Wiener-based filter sets have the same number of filter tap (filter coefficient) but with at least one different coefficient values. All input samples covered by the pre-defined filter shape are utilized to generate the Wiener-based filter output. In an example, there are (s+1) filter sets, where s represents the number of different adaptive shapes. When applying the Wiener-based filter, the adaptive shape of the to-be-filtered sample is determined at first, then the corresponding filter set is used.

In fourth embodiments according to the second aspects (hereafter referred to as embodiments d of the second aspects), only the filter with pre-defined filter shape is used as the actual Wiener-based filter and the filter is applied when the input samples covered by the pre-defined shape do not contain outliers. In an example, the Wiener-based filter can not be applied to the current to-be-filtered sample when the input samples contain at least one outlier. In another example, the Wiener-based filter is not applied to the current to-be-filtered sample when the input samples contain more than N outliers.

In fifth embodiments according to the second aspects (hereafter referred to as embodiments e of the second aspects), the adaptive shape is applied combined with any classifiers used in a Wiener-based filter. The outliers (e.g., number of outliers, position of outliers, etc.) are used as another dimension to generate the classification results. The filter coefficients derived for a specific class are used to generate the filtered output of to-be-filtered sample belongs to that corresponding class.

Third aspects of the disclosure provide technique to determine and signal the adaptive shape for Wiener-based filter into the bitstream.

In first embodiments according to the third aspects (hereafter referred to as embodiments a of the third aspects), the method of adaptive shape for Wiener-based filter is implicitly determined based on the input outlier. For example, when the number of outliers covered by the pre-defined filter shape is larger than a threshold $thr_{num}$ (e.g., 1, 2, . . . . N–1), the to-be-filtered sample uses adaptive shape to generate the Wiener-based filtering output.

In second embodiments according to the third aspects (hereafter referred to as embodiments b of the third aspects), the use of adaptive shape for Wiener-based filter is explicitly signaled into the bitstream. A flag is signaled in HLS (e.g., SPS, VPS, PPS, APS, picture header, slice header) and/or block level (e.g., CTU, block with other size). For example, when the flag is true, the corresponding region is allowed to use the method of adaptive shape for Wiener-based filter.

The filter shape is implicitly determined based on the input outlier for each to-be-filtered sample inside the region.

In third embodiments according to the third aspects (hereafter referred to as embodiments c of the third aspects), the adaptive shape for Wiener-based filter is always applied to the to-be-filtered sample.

Figure 5:
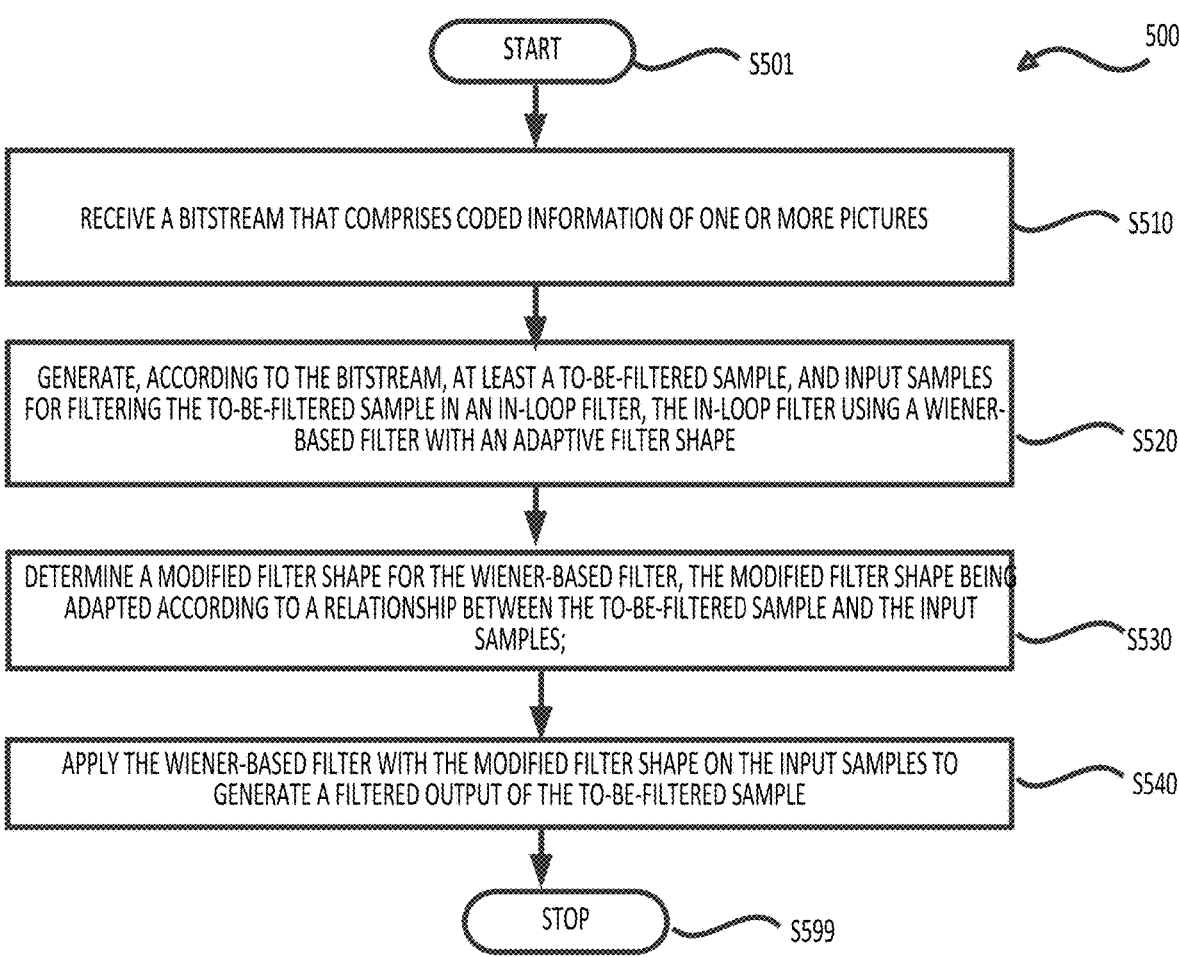
FIG. 5 shows a flow chart outlining a decoding process according to some aspects of the disclosure.

FIG. 5 shows a flow chart outlining a process (500) according to an aspect of the disclosure. The process (500) can be used in a video decoder. In various aspects, the process (500) is executed by processing circuitry, such as the processing circuitry that performs functions of the video decoder (110), the processing circuitry that performs functions of the video decoder (210), and the like. In some aspects, the process (500) is implemented in software instructions, thus when the processing circuitry executes the software instructions, the processing circuitry performs the process (500). The process starts at (S501) and proceeds to (S510).

At (S510), a bitstream that includes coded information of one or more pictures is received.

At (S520), according to the bitstream, at least a to-be-filtered sample, and input samples for filtering the to-be-filtered sample in an in-loop filter are generated. The in-loop filter uses a Wiener-based filter with an adaptive filter shape.

At (S530), a modified filter shape for the Wiener-based filter is determined. The modified filter shape is adapted according to a relationship between the to-be-filtered sample and the input samples.

At (S540), the Wiener-based filter with the modified filter shape is applied on the input samples to generate a filtered output of the to-be-filtered sample.

According to an aspect of the disclosure, to determine the modified filter shape, one or more outliers in the input samples are marked based on the relationship. The modified filter shape is adapted according to the one or more outliers.

In some examples, a difference of a first input sample to the to-be-filtered sample is compared with a threshold value, the first input sample is associated with one of filter taps of the Wiener-based filter, the threshold value is used for each filter tap of the filter taps of the Wiener-based filter. The first input sample is marked to be an outlier when the difference is out of a range defined according to the threshold value.

In some examples, a threshold value is selected from a plurality of predefined threshold candidates, the threshold value is used for each filter tap of filter taps of the Wiener-based filter. A difference of a first input sample is compared to the to-be-filtered sample with the threshold value. The first input sample is marked to be an outlier when the difference is out of a range defined according to the threshold value.

In some examples, respective threshold values for filter taps of the Wiener-based filter are selected from a plurality of predefined threshold candidates. A difference of a first input sample to the to-be-filtered sample is compared with a first threshold value selected for a first filter tap of the Wiener-based filter associated with the first input sample. The first input sample is marked to be an outlier when the difference is out of a range defined according to the first threshold value.

In some examples, a first input sample is marked to be an outlier when a position of the first input sample is out of a boundary, the boundary being at least one of a boundary of a picture, a boundary of a slice, a boundary of a tile.

In some examples, one or more input samples in the input samples are marked to be outliers when the one or more input samples are located farther from the to-be-filtered sample than other input samples in the input samples.

In some examples, to determine the modified filter shape, a pruning process of the input samples in a predetermined area starts from an immediate neighborhood of the to-be-filtered sample in an outwards order, the pruning process excludes the one or more outliers from the modified filter shape. By the pruning process, a subset of the input samples having a same number of filter taps as a predefined filter is determined, the positions of the subset of the input samples forms the modified filter shape.

In some examples, to determine the modified filter shape, delta values of the input samples to the to-be-filtered sample are calculated, and filter coefficients of the Wiener-based filter are adjusted based on the delta values.

In an example, the to-be-filtered sample and the input samples are of a first color component, the filtered output is of the first color component. In another example, the to-be-filtered sample and the input samples are of a first color component, the filtered output is an offset of a second color component that is different from the first color component.

In some examples, to apply the in-loop filter, a weighed sum of the input samples excluding the one or more outliers is generated, a non-outlier input sample in the input samples is weighted based on a filter coefficient of the Wiener-based filter associated with the non-outlier input sample, such as shown in Eq. (2).

In some examples, to apply the in-loop filter, a scaling factor for filter coefficients associated with non-outlier input samples in the input samples is calculated. Then, a weighed sum of the input samples excluding the one or more outliers is calculated, a non-outlier input sample in the input samples is weighted based on a filter coefficient of the Wiener-based filter associated with the non-outlier input sample and the scaling factor, such as shown in Eq. (3).

In some examples, to apply the in-loop filter, a Wiener-based filter set is selected from a plurality of Wiener-based filter sets according to the modified filter shape, each of the plurality of Wiener-based filter sets includes a set of filter coefficients having a same number of filter taps.

In some examples, the Wiener-based filter is applied when no outlier is marked in the input samples. In some examples, the Wiener-based filter is disabled when more than N outliners are marked in the input samples.

In some examples, a class of the to-be-filtered sample for applying the Wiener-based filter is determined at least partially according to the modified filter shape. For example, the outliers (e.g., the number of outliers, positions of the outliers) can be used as a dimension (with other suitable dimensions) for classification to generate a classification result, such as a class. Filter coefficients of the Wiener-based filter are derived based on the class. The filtered output of the to-be-filtered sample is calculated according to the filter coefficients.

In some examples, the modified filter shape is adapted according to the one or more outliers when a number of the one or more outliers is larger than a threshold.

In some examples, a signal is decoded from the coded information, the signal indicates a use of the Wiener-based filter having the adaptive filter shape.

In some examples, the adaptive shape for Wiener-based filter is always applied to the to-be-filtered sample.

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
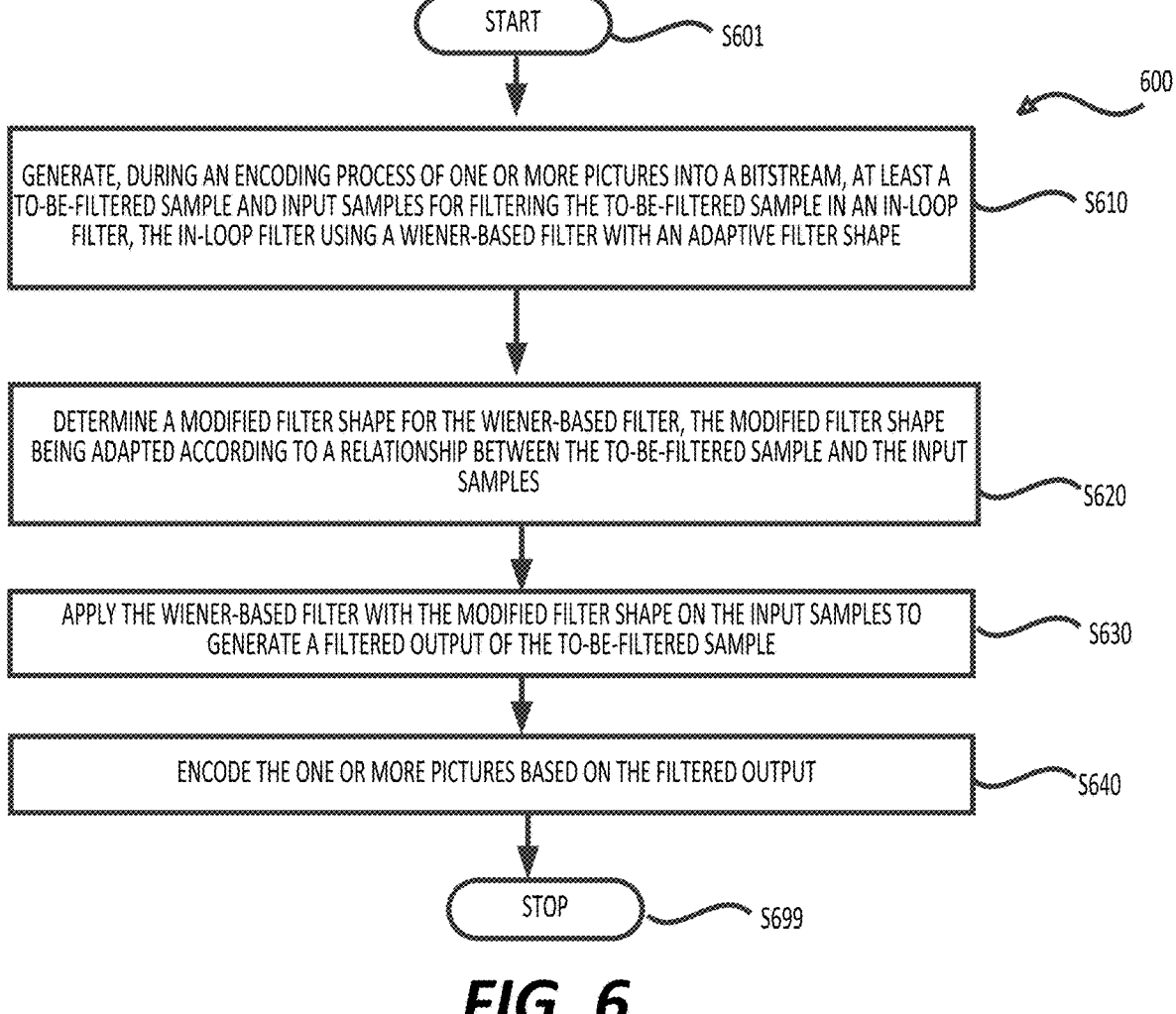
FIG. 6 shows a flow chart outlining an encoding process according to some aspects of the disclosure.

FIG. 6 shows a flow chart outlining a process (600) according to an aspect of the disclosure. The process (600)

can be used in a video decoder. In various aspects, the process (600) is executed by processing circuitry, such as the processing circuitry that performs functions of the video decoder (110), the processing circuitry that performs functions of the video decoder (210), and the like. In some aspects, the process (600) is implemented in software instructions, thus when the processing circuitry executes the software instructions, the processing circuitry performs the process (600). The process starts at (S601) and proceeds to (S610).

At (S610), during an encoding process of one or more pictures into a bitstream, at least a to-be-filtered sample and input samples for filtering the to-be-filtered sample in an in-loop filter are generated. The in-loop filter uses a Wiener-based filter with an adaptive filter shape.

At (S620), a modified filter shape for the Wiener-based filter is determined, the modified filter shape is adapted according to a relationship between the to-be-filtered sample and the input samples.

At (S630), the Wiener-based filter with the modified filter shape is applied on the input samples to generate a filtered output of the to-be-filtered sample.

At (S640), the one or more pictures are encoded based on the filtered output.

According to an aspect of the disclosure, to determine the modified filter shape, one or more outliers in the input samples are marked based on the relationship. The modified filter shape is adapted according to the one or more outliers.

In some examples, a difference of a first input sample to the to-be-filtered sample is compared with a threshold value, the first input sample is associated with one of filter taps of the Wiener-based filter, the threshold value is used for each filter tap of the filter taps of the Wiener-based filter. The first input sample is marked to be an outlier when the difference is out of a range defined according to the threshold value.

In some examples, a threshold value is selected from a plurality of predefined threshold candidates, the threshold value is used for each filter tap of filter taps of the Wiener-based filter. A difference of a first input sample is compared to the to-be-filtered sample with the threshold value. The first input sample is marked to be an outlier when the difference is out of a range defined according to the threshold value.

In some examples, respective threshold values for filter taps of the Wiener-based filter are selected from a plurality of predefined threshold candidates. A difference of a first input sample to the to-be-filtered sample is compared with a first threshold value selected for a first filter tap of the Wiener-based filter associated with the first input sample. The first input sample is marked to be an outlier when the difference is out of a range defined according to the first threshold value.

In some examples, a first input sample is marked to be an outlier when a position of the first input sample is out of a boundary, the boundary being at least one of a boundary of a picture, a boundary of a slice, a boundary of a tile.

In some examples, one or more input samples in the input samples are marked to be outliers when the one or more input samples are located farther from the to-be-filtered sample than other input samples in the input samples.

In some examples, to determine the modified filter shape, a pruning process of the input samples in a predetermined area starts from an immediate neighborhood of the to-be-filtered sample in an outwards order, the pruning process excludes the one or more outliers from the modified filter shape. By the pruning process, a subset of the input samples having a same number of filter taps as a predefined filter is determined, the positions of the subset of the input samples forms the modified filter shape.

In some examples, to determine the modified filter shape, delta values of the input samples to the to-be-filtered sample are calculated, and filter coefficients of the Wiener-based filter are adjusted based on the delta values.

In an example, the to-be-filtered sample and the input samples are of a first color component, the filtered output is of the first color component. In another example, the to-be-filtered sample and the input samples are of a first color component, the filtered output is an offset of a second color component that is different from the first color component.

In some examples, to apply the in-loop filter, a weighed sum of the input samples excluding the one or more outliers is generated, a non-outlier input sample in the input samples is weighted based on a filter coefficient of the Wiener-based filter associated with the non-outlier input sample, such as shown in Eq. (2).

In some examples, to apply the in-loop filter, a scaling factor for filter coefficients associated with non-outlier input samples in the input samples is calculated. Then, a weighed sum of the input samples excluding the one or more outliers is calculated, a non-outlier input sample in the input samples is weighted based on a filter coefficient of the Wiener-based filter associated with the non-outlier input sample and the scaling factor, such as shown in Eq. (3).

In some examples, to apply the in-loop filter, a Wiener-based filter set is selected from a plurality of Wiener-based filter sets according to the modified filter shape, each of the plurality of Wiener-based filter sets includes a set of filter coefficients having a same number of filter taps.

In some examples, the Wiener-based filter is applied when no outlier is marked in the input samples. In some examples, the Wiener-based filter is disabled when more than N outliners are marked in the input samples.

In some examples, a class of the to-be-filtered sample for applying the Wiener-based filter is determined at least partially according to the modified filter shape. For example, the outliers (e.g., the number of outliers, positions of the outliers) can be used as a dimension (with other suitable dimensions) for classification to generate a classification result, such as a class. Filter coefficients of the Wiener-based filter are derived based on the class. The filtered output of the to-be-filtered sample is calculated according to the filter coefficients.

In some examples, the modified filter shape is adapted according to the one or more outliers when a number of the one or more outliers is larger than a threshold.

In some examples, the encoder side determines to use the Wiener-based filter with the adaptive filter shape and encodes a signal into the coded information, the signal indicates the use of the Wiener-based filter with the adaptive filter shape.

In some examples, the adaptive shape for Wiener-based filter is always applied to the to-be-filtered sample.

Then, the process proceeds to (S699) and terminates.

The process (600) can be suitably adapted. Step(s) in the process (600) can be modified and/or omitted. Additional step(s) can be added. Any suitable order of implementation can be used.

According to an aspect of the disclosure, a method of processing visual media data is provided. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of one or more pictures. The format rule specifies that at least a to-be-filtered sample, and input samples for filtering the to-be-filtered sample in an in-loop filter are generated. The in-loop filter uses a Wiener-based filter with an adaptive filter shape. A modified filter shape for the Wiener-based filter is determined. The modified filter shape is adapted according to a relationship between the to-be-filtered sample and the input samples. The Wiener-based filter with the modified filter shape is applied on the input samples to generate a filtered output of the to-be-filtered sample.

The techniques described above, can be implemented as computer software using computer-readable instructions and physically stored in one or more computer-readable media. For example, FIG. 7 shows a computer system (700) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
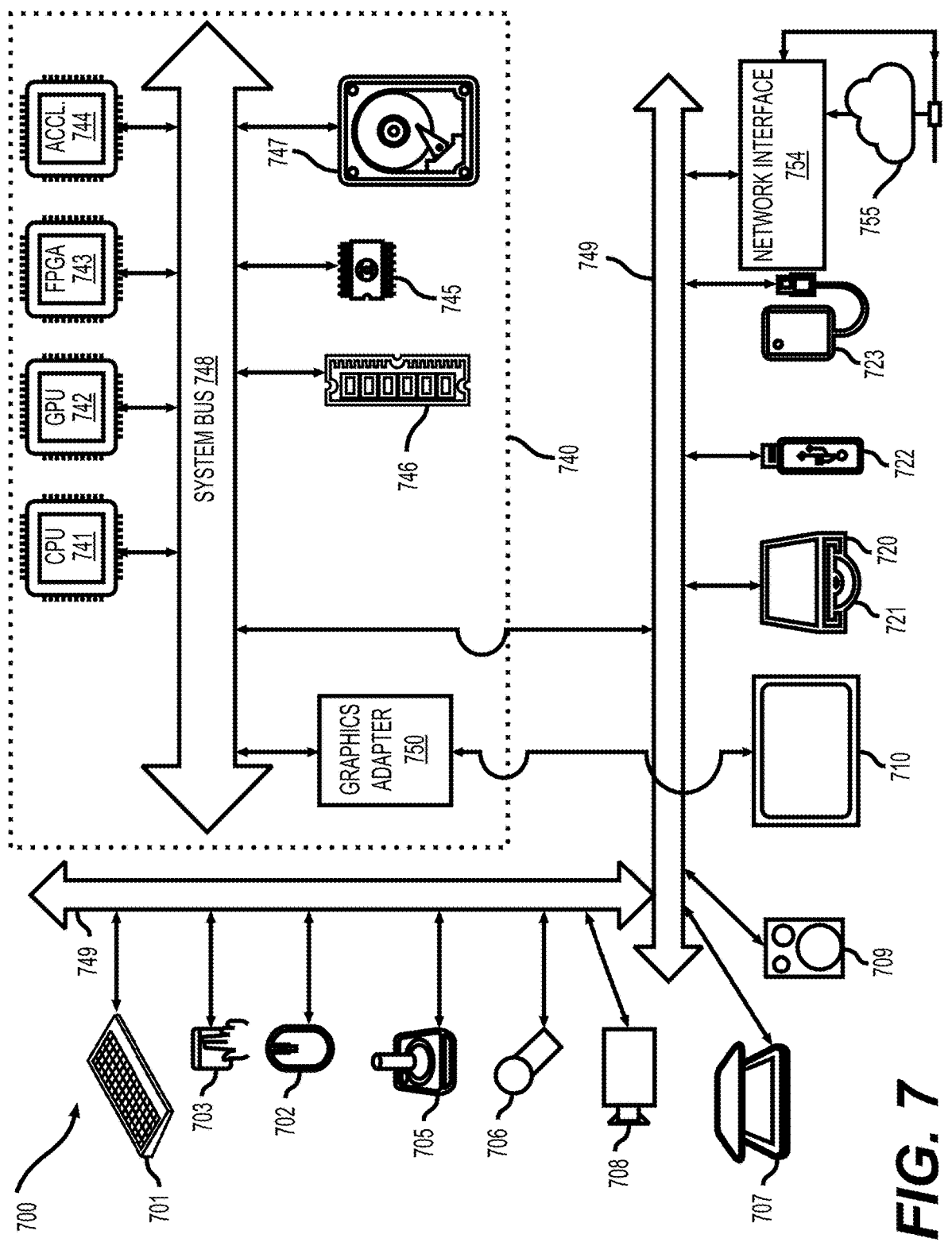
FIG. 7 is a schematic illustration of a computer system in accordance with an aspect.

The components shown in FIG. 7 for computer system (700) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various aspects of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video decoding, the method including: receiving a bitstream that comprises coded information of one or more pictures; generating, according to the bitstream, at least a to-be-filtered sample, and input samples for filtering the to-be-filtered sample in an in-loop filter, the in-loop filter using a Wiener-based filter with an adaptive filter shape; determining a modified filter shape for the Wiener-based filter, the modified filter shape being adapted according to a relationship between the to-be-filtered sample and the input samples; and applying the Wiener-based filter with the modified filter shape on the input samples to generate a filtered output of the to-be-filtered sample.

(2) The method of feature (1), the method including: the marking one or more outliers in the input samples based on a relationship of the to-be-filtered sample and the input samples; and determining the modified filter shape that is adapted according to the one or more outliers.

(3) The method of any of features (1) to (2), the method including: comparing a difference of a first input sample to the to-be-filtered sample with a threshold value, the first input sample being associated with one of filter taps of the Wiener-based filter, the threshold value being used for each filter tap of the filter taps of the Wiener-based filter; and marking the first input sample to be an outlier when the difference is out of a range defined according to the threshold value.

(4) The method of any of features (1) to (3), the method including: selecting a threshold value from a plurality of predefined threshold candidates, the threshold value being used for each filter tap of filter taps of the Wiener-based filter; comparing a difference of a first input sample to the to-be-filtered sample with the threshold value; and marking the first input sample to be an outlier when the difference is out of a range defined according to the threshold value.

(5) The method of any of features (1) to (4), the method including: selecting respective threshold values for filter taps of the Wiener-based filter from a plurality of predefined threshold candidates; comparing a difference of a first input sample to the to-be-filtered sample with a first threshold value selected for a first filter tap of the Wiener-based filter associated with the first input sample; and marking the first input sample to be an outlier when the difference is out of a range defined according to the first threshold value.

(6) The method of any of features (1) to (5), the method including: marking a first input sample to be an outlier when a position of the first input sample is out of a boundary, the boundary being at least one of a boundary of a picture, a boundary of a slice, a boundary of a tile.

(7) The method of any of features (1) to (6), the method including marking one or more input samples in the input samples to be outliers when the one or more input samples are located farther from the to-be-filtered sample than other input samples in the input samples.

(8) The method of any of features (1) to (7), the method including: starting a pruning process of the input samples in a predetermined area from an immediate neighborhood of the to-be-filtered sample in an outwards order, the pruning process excluding the one or more outliers from the modified filter shape; and determining, by the pruning process, a subset of the input samples having a same number of filter taps as a predefined filter.

(9) The method of any of features (1) to (8), the method including: calculating delta values of the input samples to the to-be-filtered sample; and adjusting filter coefficients of the Wiener-based filter based on the delta values.

(10) The method of any of features (1) to (9), in which the to-be-filtered sample and the input samples are of a first color component, the filtered output is of the first color component or is an offset of a second color component that is different from the first color component.

(11) The method of any of features (1) to (10), the method including: generating a weighed sum of the input samples excluding the one or more outliers, a non-outlier input sample in the input samples being weighted based on a filter coefficient of the Wiener-based filter associated with the non-outlier input sample.

(12) The method of any of features (1) to (11), the method including: calculating a scaling factor for filter coefficients associated with non-outlier input samples in the input samples; and generating a weighed sum of the input samples excluding the one or more outliers, a non-outlier input sample in the input samples being weighted based on a filter coefficient of the Wiener-based filter associated with the non-outlier input sample and the scaling factor.

(13) The method of any of features (1) to (12), the method including: selecting a Wiener-based filter set from a plurality of Wiener-based filter sets according to the modified filter shape, each of the plurality of Wiener-based filter sets including a set of filter coefficients having a same number of filter taps.

(14) The method of any of features (1) to (13), the method including: applying the Wiener-based filter when no outlier is marked in the input samples; and/or disabling the Wiener-based filter when more than N outliners are marked in the input samples.

(15) The method of any of features (1) to (14), the method including: determining a class of the to-be-filtered sample for applying the Wiener-based filter at least partially according to the modified filter shape; deriving filter coefficients of the Wiener-based filter based on the class; and calculating the filtered output of the to-be-filtered sample according to the filter coefficients.

(16) The method of any of features (1) to (15), the method including adapting the modified filter shape according to the one or more outliers when a number of the one or more outliers is larger than a threshold.

(17) The method of any of features (1) to (16), the method including: decoding a signal from the coded information, the signal indicating a use of the Wiener-based filter having the adaptive filter shape.

(18) A method of video encoding, the method including: generating, during an encoding process of one or more pictures into a bitstream, at least a to-be-filtered sample and input samples for filtering the to-be-filtered sample in an in-loop filter, the in-loop filter using a Wiener-based filter with an adaptive filter shape; determining a modified filter shape for the Wiener-based filter, the modified filter shape being adapted according to a relationship between the to-be-filtered sample and the input samples; applying the Wiener-based filter with the modified filter shape on the input samples to generate a filtered output of the to-be-filtered sample; and encoding the one or more pictures based on the filtered output.

(19) The method of feature (18), the method including: marking one or more outliers in the input samples based on a relationship of the to-be-filtered sample and the input samples; and determining the modified filter shape that is adapted according to the one or more outliers.

(20) The method of any of features (18) to (19), the method including: comparing a difference of a first input sample to the to-be-filtered sample with a threshold value, the first input sample being associated with one of filter taps of the Wiener-based filter, the threshold value being used for each filter tap of the filter taps of the Wiener-based filter; and marking the first input sample to be an outlier when the difference is out of a range defined according to the threshold value.

(21) The method of any of features (18) to (20), the method including: selecting a threshold value from a plurality of predefined threshold candidates, the threshold value being used for each filter tap of filter taps of the Wiener-based filter; comparing a difference of a first input sample to the to-be-filtered sample with the threshold value; and marking the first input sample to be an outlier when the difference is out of a range defined according to the threshold value.

(22) The method of any of features (18) to (21), the method further including: selecting respective threshold values for filter taps of the Wiener-based filter from a plurality of predefined threshold candidates; comparing a difference of a first input sample to the to-be-filtered sample with a first threshold value selected for a first filter tap of the Wiener-based filter associated with the first input sample; and marking the first input sample to be an outlier when the difference is out of a range defined according to the first threshold value.

(23) The method of any of features (18) to (22), the method including: marking a first input sample to be an outlier when a position of the first input sample is out of a boundary, the boundary being at least one of a boundary of a picture, a boundary of a slice, a boundary of a tile.

(24) The method of any of features (18) to (23), the method including: marking one or more input samples in the input samples to be outliers when the one or more input samples are located farther from the to-be-filtered sample than other input samples in the input samples.

(25) The method of any of features (18) to (24), the method including: starting a pruning process of the input samples in a predetermined area from an immediate neighborhood of the to-be-filtered sample in an outwards order, the pruning process excluding the one or more outliers from the modified filter shape; and determining, by the pruning process, a subset of the input samples having a same number of filter taps as a predefined filter.

(26) The method of any of features (18) to (25), the method further including: calculating delta values of the input samples to the to-be-filtered sample; and adjusting filter coefficients of the Wiener-based filter based on the delta values.

(27) The method of any of features (18) to (26), in which the to-be-filtered sample and the input samples are of a first color component, the filtered output is of the first color component or an offset of a second color component that is different from the first color component.

(28) The method of any of features (18) to (27), the method including: generating a weighed sum of the input samples excluding the one or more outliers, a non-outlier input sample in the input samples being weighted based on a filter coefficient of the Wiener-based filter associated with the non-outlier input sample.

(29) The method of any of features (18) to (28), the method including: calculating a scaling factor for filter coefficients associated with non-outlier input samples in the input samples; and generating a weighed sum of the input samples excluding the one or more outliers, a non-outlier input sample in the input samples being weighted based on a filter coefficient of the Wiener-based filter associated with the non-outlier input sample and the scaling factor.

(30) The method of any of features (18) to (29), the method further including: selecting a Wiener-based filter set from a plurality of Wiener-based filter sets according to the modified filter shape, each of the plurality of Wiener-based filter sets including a set of filter coefficients having a same number of filter taps.

(31) The method of any of features (18) to (30), the method including applying the Wiener-based filter when no outlier is marked in the input samples; and/or disabling the Wiener-based filter when more than N outliners are marked in the input samples.

(32) The method of any of features (18) to (32), the method including: determining a class of the to-be-filtered sample for applying the Wiener-based filter at least partially according to the modified filter shape; deriving filter coefficients of the Wiener-based filter based on the class; and calculating the filtered output of the to-be-filtered sample according to the filter coefficients.

(33) The method of any of features (18) to (32), the method including adapting the modified filter shape according to the one or more outliers when a number of the one or more outliers is larger than a threshold.

(34) The method of any of features (18) to (33), the method further including: encoding a signal into the bitstream, the signal indicating a use of the Wiener-based filter having the adaptive filter shape.

(35) A method of processing visual media data, the method including processing a bitstream of visual media data according to a format rule. The bitstream includes coded information of one or more pictures. The format rule specifies that: according to the bitstream, at least a to-be-filtered sample, and input samples for filtering the to-be-filtered sample in an in-loop filter are generated, the in-loop filter using a Wiener-based filter with an adaptive filter shape; a modified filter shape for the Wiener-based filter is determined, the modified filter shape being adapted according to a relationship between the to-be-filtered sample and the input samples; and the Wiener-based filter with the modified filter shape is applied on the input samples to generate a filtered output of the to-be-filtered sample.

(36) An apparatus for video decoding, including processing circuitry that is configured to perform the method of any of features (1) to (17).

(37) An apparatus for video encoding, including processing circuitry that is configured to perform the method of any of features (18) to (34).

(38) A non-transitory computer-readable storage medium storing instructions which when executed by at least one processor cause the at least one processor to perform the method of any of features (1) to (35).

What is claimed is:

1. A method of video decoding, comprising:
receiving a bitstream that comprises coded information of one or more pictures;
generating, according to the bitstream, at least a to-be-filtered sample, and input samples for filtering the to-be-filtered sample in an in-loop filter, the in-loop filter being based on a Wiener-based filter with a predetermined filter shape;
identifying one or more outliers in the input samples when a difference between each of the one or more outliers and the to-be-filtered sample is outside of a shared range or a range associated with the respective outlier;

modifying the predetermined filter shape of the Wiener-based filter to obtain a modified filter with a modified filter shape based on exclusion of the one or more outliers from the modified filter; and
applying the modified filter with the modified filter shape on the input samples to generate a filtered output of the to-be-filtered sample.

2. The method of claim 1, wherein the identifying the one or more outliers comprises:
comparing a difference of a first input sample to the to-be-filtered sample with a threshold value, the first input sample being associated with one of filter taps of the Wiener-based filter, the threshold value being used for each filter tap of the filter taps of the Wiener-based filter; and
identifying the first input sample to be an outlier when the difference is out of a range defined according to the threshold value.

3. The method of claim 1, wherein the identifying the one or more outliers comprises:
selecting a threshold value from a plurality of predefined threshold candidates, the threshold value being used for each filter tap of filter taps of the Wiener-based filter;
comparing a difference of a first input sample to the to-be-filtered sample with the threshold value; and
identifying the first input sample to be an outlier when the difference is out of a range defined according to the threshold value.

4. The method of claim 1, wherein the identifying the one or more outliers comprises:
selecting respective threshold values for filter taps of the Wiener-based filter from a plurality of predefined threshold candidates;
comparing a difference of a first input sample to the to-be-filtered sample with a first respective threshold value selected for a first filter tap of the Wiener-based filter associated with the first input sample; and
identifying the first input sample to be an outlier when the difference is out of a range defined according to the respective threshold value.

5. The method of claim 1, wherein the identifying the one or more outliers comprises:
identifying a first input sample to be an outlier when a position of the first input sample is out of a boundary, the boundary being at least one of a boundary of a picture, a boundary of a slice, a boundary of a tile.

6. The method of claim 1, wherein the identifying the one or more outliers comprises:
identifying one or more input samples in the input samples to be outliers when the one or more input samples are located farther from the to-be-filtered sample than other input samples in the input samples.

7. The method of claim 1, wherein the modifying the predetermined filter shape comprises:
starting a pruning process of the input samples in a predetermined area from an immediate neighborhood of the to-be-filtered sample in an outwards order, the pruning process excluding the one or more outliers; and
determining, by the pruning process, a subset of the input samples having a same number of filter taps the predetermined filter shape.

8. The method of claim 1, wherein modifying the predetermined filter shape comprises:
calculating delta values of the input samples to the to-be-filtered sample; and
adjusting filter coefficients of the Wiener-based filter based on the delta values.

9. The method of claim 1, wherein the to-be-filtered sample and the input samples are of a first color component, the filtered output is of the first color component or is an offset of a second color component that is different from the first color component.

10. The method of claim 1, wherein the applying the modified filter comprises:

generating a weighted sum of the input samples excluding the one or more outliers, a non-outlier input sample in the input samples being weighted based on a filter coefficient of the Wiener-based filter associated with the non-outlier input sample.

11. The method of claim 1, wherein the applying the modified filter comprises:

calculating a scaling factor for filter coefficients associated with non-outlier input samples in the input samples; and generating a weighted sum of the input samples excluding the one or more outliers, a non-outlier input sample in the input samples being weighted based on a filter coefficient of the Wiener-based filter associated with the non-outlier input sample and the scaling factor.

12. The method of claim 1, wherein the applying the modified filter comprises:

selecting a Wiener-based filter set from a plurality of Wiener-based filter sets according to the modified filter shape, each of the plurality of Wiener-based filter sets including a set of filter coefficients having a same number of filter taps.

13. The method of claim 1, wherein the applying the modified filter comprises:

applying the Wiener-based filter when no outlier is identified in the input samples; or disabling the Wiener-based filter when more than a reference number of outliners are marked identified in the input samples.

14. The method of claim 1, further comprising:

determining a class of the to-be-filtered sample for applying the Wiener-based filter at least partially according to the modified filter shape;

deriving filter coefficients of the Wiener-based filter based on the class; and calculating the filtered output of the to-be-filtered sample according to the filter coefficients.

15. The method of claim 1, further comprising:

adapting the modified filter shape according to the one or more outliers when a number of the one or more outliers is larger than a threshold.

16. The method of claim 1, further comprising:

decoding a signal from the coded information, the signal indicating that the predetermined filter shape of the Wiener-based filter is modifiable based on presence of the one or more outliers.

17. A method of video encoding, comprising:

generating, during an encoding process of one or more pictures into a bitstream, at least a to-be-filtered sample and input samples for filtering the to-be-filtered sample in an in-loop filter, the in-loop filter being based on a Wiener-based filter with a predetermined filter shape;

identifying one or more outliers in the input samples when a difference between each of the one or more outliers and the to-be-filtered sample is outside of a shared range or a range associated with the respective outlier;

modifying the predetermined filter shape of the Wiener-based filter to obtain a modified filter with a modified filter shape based on exclusion of the one or more outliers from the modified filter;

applying the modified filter with the modified filter shape on the input samples to generate a filtered output of the to-be-filtered sample; and encoding the one or more pictures into the bitstream based on the filtered output.

18. The method of claim 17, further comprising:

encoding a signal into the bitstream, the signal indicating that the predetermined filter shape of the Wiener-based filter is modifiable based on presence of the one or more outliers.

19. The method of claim 17, wherein the to-be-filtered sample and the input samples are of a first color component, the filtered output is of the first color component or is an offset of a second color component that is different from the first color component.

20. A non-transitory computer-readable storage medium storing instructions which, when executed by a processor, cause the processor to perform a method of encoding a bitstream, the method comprising:

generating, during an encoding process of one or more pictures into the bitstream, at least a to-be-filtered sample and input samples for filtering the to-be-filtered sample in an in-loop filter, the in-loop filter being based on a Wiener-based filter with a predetermined filter shape;

identifying one or more outliers in the input samples when a difference between each of the one or more outliers and the to-be-filtered sample is outside of a shared range or a range associated with the respective outlier;

modifying the predetermined filter shape of the Wiener-based filter to obtain a modified filter with a modified filter shape based on exclusion of the one or more outliers from the modified filter;

applying the modified filter with the modified filter shape on the input samples to generate a filtered output of the to-be-filtered sample;

encoding the one or more pictures into the bitstream based on the filtered output; and transmitting the bitstream.

* * * * *